United States Patent [19]

Uchida

[11] Patent Number: 4,538,267

[45] Date of Patent: Aug. 27, 1985

[54] PROTECTING DEVICE IN SELF-DIAGNOSIS

[75] Inventor: Hiroyasu Uchida, Kanagawa, Japan

[73] Assignee: Fuji Xerox Co., Ltd., Tokyo, Japan

[21] Appl. No.: 406,142

[22] Filed: Aug. 9, 1982

[30] Foreign Application Priority Data

Aug. 10, 1981 [JP] Japan .................................. 56-124114

[51] Int. Cl.$^3$ ............................................. G01R 31/28
[52] U.S. Cl. .................................... 371/20; 355/14 C;
371/17
[58] Field of Search ................. 371/20, 17; 324/73 R,
324/73 AT, 73 PC; 355/14 C

[56] References Cited

U.S. PATENT DOCUMENTS

| 4,158,432 | 6/1979 | van Bavel | 371/20 |
| 4,162,396 | 7/1979 | Howard et al. | 371/20 |
| 4,206,995 | 6/1980 | Legg | 355/14 C |
| 4,245,309 | 1/1981 | Kiefer | 371/20 |
| 4,365,334 | 12/1982 | Smith et al. | 371/20 X |

Primary Examiner—Charles E. Atkinson
Attorney, Agent, or Firm—Sughrue, Mion, Zinn, Macpeak & Seas

[57] ABSTRACT

An apparatus having a self-diagnosis mode of operation includes a memory for storing data identifying one or more other components which should be activated when a particular component is specified by the operator for testing.

7 Claims, 2 Drawing Figures

PROTECTING DEVICE IN SELF-DIAGNOSIS

BACKGROUND OF THE INVENTION

This invention relates to self-diagnosis type protecting devices for computer-controlled apparatuses such as copying machines, and more particularly to a self-diagnosis type protecting device which prevents the trouble that, when a specified output terminal (or a specified component) is solely started and stopped irrespective of other input or output terminals, the specified output terminal overruns to damage other output or input terminals.

In maintenance and inspection or repair of a copying machine or the like, a method has been employed in which components (or output terminals such as motors, relays and lamps) are operated individually irrespective of their normal cooperative operation so that they are subjected to self-diagnosis according to an inspection program which is stored in advance. A conventional self-diagnosis method, which is applied to a copying machine, will be briefly described with reference to FIG. 1.

FIG. 1 is a block diagram of a copying machine which is controlled by a computer. In FIG. 1, reference numeral 1 designates a CPU (central processing unit); 2, a ROM (read-only memory); 3, a RAM (random access memory); 4, an input port; and 5, an output port.

Further in FIG. 1, reference numeral 6 designates a common buss connecting the CPU 1, the ROM 2, the RAM 3, the input port 4 and the output port to one another; 10, a copying machine body which is connected through the input port 4 and the output port 5 to a computer section (consisting of the CPU 1, the ROM 2, the RAM 3, etc.); and 10A, the front panel of the copying machine body 10.

In self-diagnosis, the operating mode of the copying machine is changed from a copying mode to a self-diagnosis mode by operation switches (not shown) provided on the front panel or in another suitable location.

Thereupon, the keys and switches on the front panel 10A display the self-diagnosis mode, specify parts to be inspected (output terminals such as motors, relays, lamps, etc.), start or stop the parts thus specified, and display the states of these parts. In general, a ten-key array is used to specify the parts to be inspected, a copy start key and a copy stop key are used to start and stop the designated parts, respectively, and various display lamps and number-of-sheet display units are employed to display the states of these parts.

In association with this, a self-diagnosis program which has been stored in the ROM 2 is called out and executed by operating the keys on the front panel.

Heretofore, in the self-diagnosis of the copying machine as described above, only a specified output terminal is individually started and stopped under the condition that the operations of other associated output terminals or input terminals are stopped or made ineffective. This method suffers from the following drawbacks.

(1) When a lamp, for instance, is specified so as to be turned on, it is necessary to simultaneously start the cooling fan. If, in this case, the cooling fan is not started, the lamp and components around the lamp may be damaged.

(2) When either of the fractional magnification optical system driving motor or the sheet feeding tray driving motor, for instance, are specified and started, it is necessary to receive signals from limit switches adapted to limit the movement of the motor within an allowable value, to thereby control the driving motor. Otherwise, the fractional magnification optical system or the sheet feeding tray will overrun their respective limit positions to damage either themselves or other adjacent components.

In order to eliminate the above-described difficulties, it is necessary for the operator, at the same time as an output terminal is specified in self-diagnosis, to specify an input terminal and/or an output terminal which relates to the output terminal thus specified. This is undoubtedly troublesome for the operator.

SUMMARY OF THE INVENTION

It is an object of this invention to provide a protecting device in which the above-described difficulties have been eliminated, and which automatically prevents the overrunning of a component when the operator specifies only a desired output terminal so that the latter starts. This and other objects are achieved according to this invention by storing in a memory an input terminal and/or an output terminal which should be operated simultaneously with the starting of a specified output terminal during self-diagnosis to protect the specified output terminal from damage. In this way, when an output terminal is specified by the operator, the related input terminal and/or the output terminal stored in the memory is automatically also specified.

BRIEF DESCRIPTION OF THE DRAWINGS

The invention will be more clearly understood from the following description in conjunction with the accompanying drawings, in which.

DETAILED DESCRIPTION OF THE INVENTION

In this invention, a table should be prepared by indicating the following for each output terminal:

(1) Whether the output terminal should be protected or not.

(2) If an output terminal should be protected, what input terminals and/or output terminals should be specified in association with the selection of the output terminal (hereinafter referred to as "associated input/output terminals", when applicable). The table thus prepared is then stored in the ROM or the like.

One example of at least a portion of such a table is as shown below. It goes without saying that it is not always necessary to list output terminals which need no protection. It should be noted at this time that the term "output terminal" is used herein to designate a terminal, or a device connected to a terminal, which should be tested.

TABLE 1

| Output Terminal | | Protection | Associated Input/Output Terminal |
|---|---|---|---|
| Lamp | | Need | Blowing fan |
| Original conveying motor | | Not need | |
| Sheet feeding tray driving | In upward movement | Need | Upper limit switch |

TABLE 1-continued

| Output Terminal | Protection | Associated Input/Output Terminal |
| --- | --- | --- |
| motor In downward movement | | Lower limit switch |
| Fractional magnification optical system driving motor | Need | Limit switch |

Figure 1:
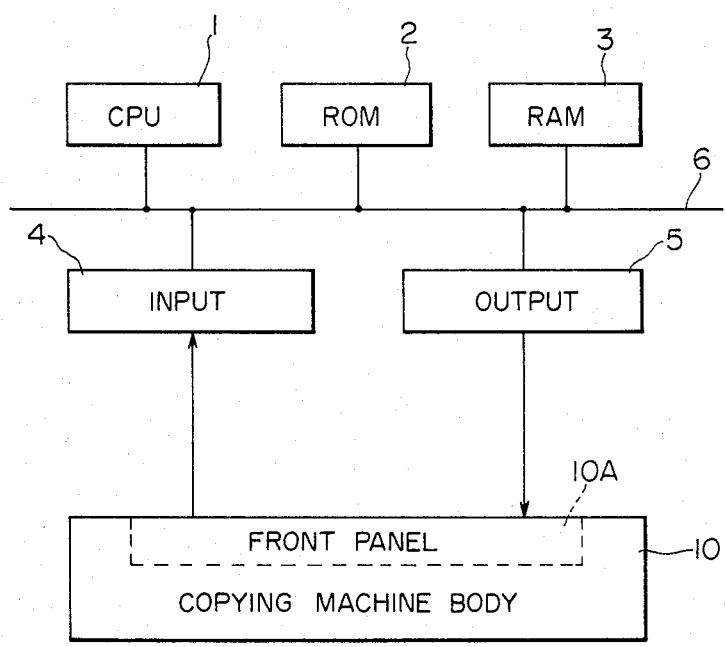
FIG. 1 is a block diagram outlining the arrangement of a computer-controlled device having a self-diagnosing function.
Figure 2:
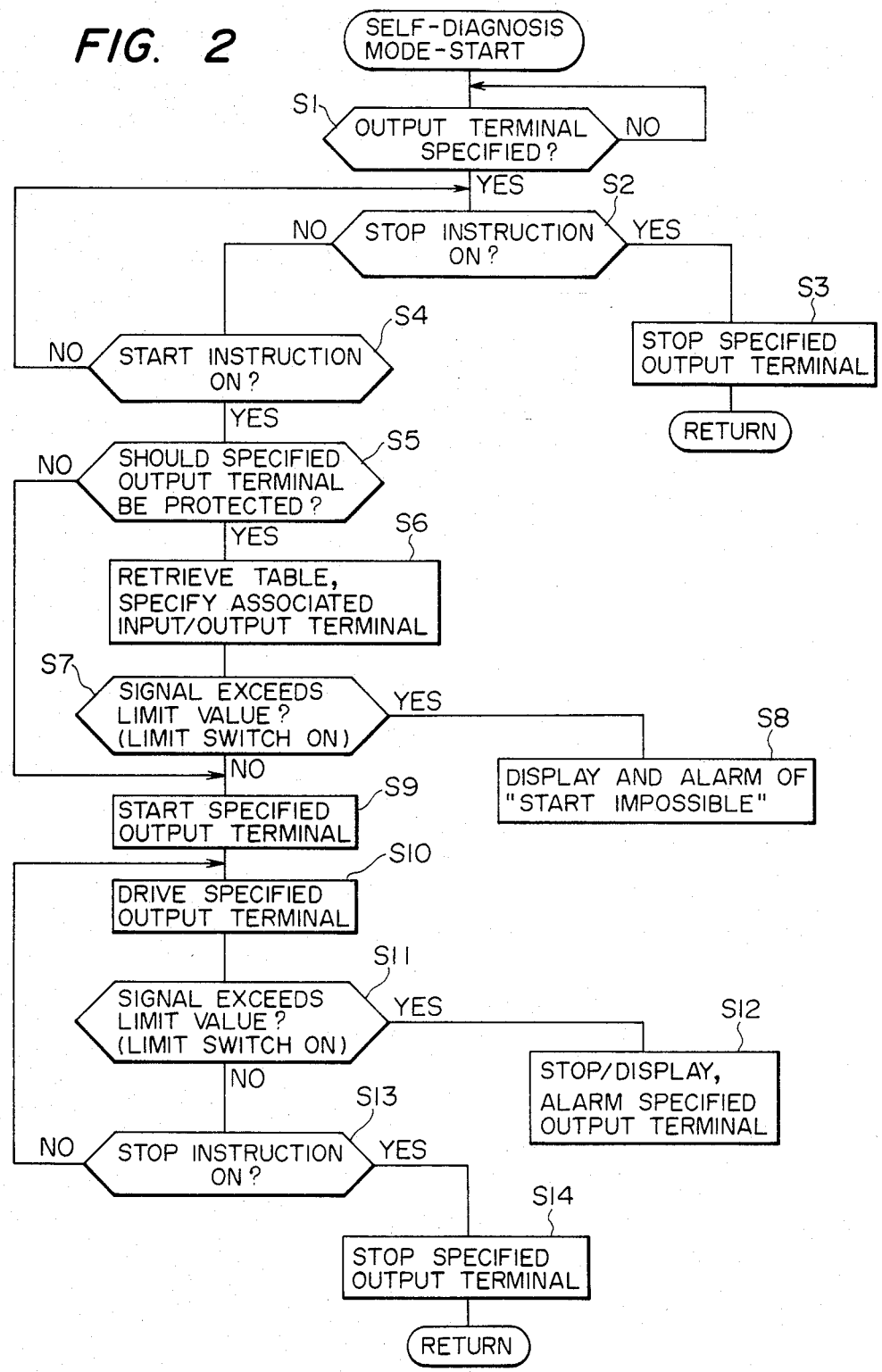
FIG. 2 is a flow chart for a description of the operation of one embodiment of this invention.

The operation of one embodiment of this invention will now be described with reference to a flow chart in FIG. 2. In this case, the technical concept of the invention is applied to the self-diagnosis of a copying machine; however, it goes without saying that the invention is not limited thereto or thereby and the technical concept of the invention can be applied to the self-diagnosis of other apparatuses which are operated under control of computers.

After the operating mode of the copying machine is changed to the self-diagnosis mode by conventional suitable means, it is determined in Step S1 whether or not an output terminal or a component (such as a motor, a relay, a lamp, and a fixing unit) has been specified by operating the key or keys on the front panel. If no output terminal is yet specified, Step S1 is held until an output terminal is specified. When the output terminal is specified, the operation is advanced to Step S2, in which it is determined whether or not a key on the front panel adapted to stop the specified output terminal has been turned on. When it is determined that the stop key has been turned on, the operation is advanced to Step S3 where the operation of the specified output terminal is stopped and the operating condition is returned to the initial condition.

If the stop key has not been turned on, it is determined whether or not the start key on the front panel adapted to start the specified output terminal has been turned on.

When it is determined in Step S4 that the start key has not yet been turned on, the operation step is returned to Step S2 so as to receive the instruction for the specified output terminal.

When it is determined that the start key has been turned on in Step S4, Step S5 is effected. In Step S5, it is determined whether or not the specified output terminal should be protected. The determination in Step S5 can be readily achieved by retrieving the aforementioned Table 1 (stored in the ROM 2 or the like in advance). When it is determined that the specified output terminal is one which needs protection (hereinafter referred to as "a protection output terminal", when applicable), the operation step is advanced to Step S6. In Step S6, the associated input/output terminal is selected by retrieving Table 1 stored in the ROM 2 or the like if it has not already been retrieved in Step S5, so that the associated input/output terminal is also specified as one to be subjected to self-diagnosis. For instance, in the case where the fractional magnification optical system driving motor of the copying machine has been specified by the operator so that it is subjected to self-diagnosis, the limit switch should be subjected to self-diagnosis in association with the motor thus specified, as is apparent from Table 1.

In Step S7, it is determined whether or not a signal from the associated input terminal thus automatically specified exceeds a limit value, e.g. whether or not the limit switch has been operated. If the signal exceeds the limit value, e.g., if the limit switch has been operated, the operation is advanced to Step S8. In Step S8, the display "START IMPOSSIBLE" is made, and an alarm is given, if necessary.

If it is determined in Step S7 that the signal from the associated input terminal does not exceed the limit value, e.g., if the limit switch is not operated, the operation is advanced to Step S9, in which the specified output terminal is started. In Step S9, the specified output terminal is continuously driven. During this period, the same determination process as that in Step S7 is carried out in Step S11. If the signal from the associated input terminal does not exceed the limit value switch even when the specified output terminal is driven, then the operation is advanced to Step S13, in which it is determined whether or not a stop instruction is provided.

When it is determined that the stop instruction is provided in Step S13, the operation is returned to Step S10, as a result of which the operation circulates in a loop of Step S11, Step S13 and Step 10 in the stated order. When the stop instruction is provided, the condition in Step S13 is satisfied and the operation is advanced to Step S14. In Step S14, the driving of the specified output terminal is stopped, and the operating condition is returned to the initial state.

On the other hand, when the limit value is exceeded by the signal from the associated input terminal when the specified output terminal is driven in Step S10, the operation is advanced to Step S12 in which the specified output terminal is stopped. At the same time, the fact that the specified output terminal has reached the limit is displayed to give an alarm, if necessary.

In the case where the specified output terminal is the fractional magnification optical system driving motor or the sheet feeding tray driving motor, there are two limit switches (or associated input terminals) in the respective driving directions thereof. Therefore, the operation may be so modified that the driving direction is detected and only the limit switch in the driving direction thus detected is automatically specified. This can be readily achieved by employing a method in which, between Steps S5 and S7, the direction of the start instruction is detected and only the associated input terminal in the direction thus detected is automatically specified.

In the case where the output terminal specified by the operator is a lamp, the blowing fan which is the associated output terminal of the lamp should merely be automatically specified to start at the same time. Therefore, Steps S7 and S8 and Steps S11 through S14 can be eliminated.

As is apparent from the above description, according to the invention, all that is necessary for the operator in the self-diagnosis of a copying machine or the like is to specify only an output terminal which should be inspected. The input/output terminals, which must be specified and operated in association with the output terminal thus specified, are automatically retrieved and specified according to a predetermined table. Therefore, the problem is eliminated whereby the associated parts are damaged because they are not specified. Furthermore, it is unnecessary for the operator to pay attention to other things, and accordingly the efficiency in inspection and in trouble shooting can be remarkably improved.

What is claimed is:

1. In a copying machine of the type having output means comprising a plurality of electromechanical operating devices and activating means for activating said output means, and having a self-diagnosis mode of operation whereby a specified output means of said copying machine is activated by said activating means for testing purposes, and selection means manually operable by said operator for specifying desired output means, said selection means comprising control means on a machine front panel for designating individual ones of said operating devices to be activated for testing purposes, the improvement comprising:

protecting means, responsive to the operation of said selection means whereby a desired output means is specified, for automatically specifying at least one further output means to be activated during testing of said desired output means.

2. An apparatus as claimed in claim 1, wherein said protecting means comprises memory means for storing data identifying said at least one further output means and providing an output signal designating said at least one further output means in response to specifying of said desired output means.

3. An apparatus as claimed in claim 2, wherein said memory means stores data representing further output means which must be activated when any one of a plurality of different output means are selected by said selection means, said memory means, in response to an address signal corresponding to the specified output means, reading out a further output means associated with said specified output means.

4. An apparatus as claimed in claim 1, wherein one desired output means to be activated comprises a mechanically movable component having a movement range limit, said at least one further output means corresponding to said one desired output means comprising a sensor for sensing the arrival of said movable component substantially at said movement range limit.

5. An apparatus as claimed in claim 2, wherein said activating means includes a control computer and a read only memory and random access memory coupled to said computer, wherein said plurality of output means comprise a plurality of electromechanical operating devices selectively activated by said control computer in accordance with operation of said selection means, wherein said memory means comprises at least a portion of said read only memory.

6. In an apparatus of the type having a plurality of output means and activating means for activating said output means, and having a self-diagnosis mode of operation whereby a specified output means of said apparatus is activated by said activating means for testing purposes, and selection means manually operable by said operator for specifying desired output means, the improvement comprising:

protecting means, responsive to the operation of said selection means whereby a desired output means is specified, for automatically specifying at least one further output means to be activated during testing of said desired output means, said desired output means to be activated comprising a mechanically movable component having a movement range limit, and said at least one further output means corresponding to said one desired output means comprising a sensor for sensing the arrival of said movable components substantially at said movement range limit.

7. An apparatus of the type having a plurality of output means, including a plurality of electromechanical operating devices, selection means manually operable by an operator for specifying desired output means, and activating means for activating said output means, said activating means comprising a control computer and a read only memory and random access memory coupled to said computer, said plurality of electromechanical operating devices being selectively activated by said control computer in accordance with operation of said selection means, said apparatus having a self-diagnosis mode of operation whereby a specified output means of said apparatus is activated by said activating means for testing purposes, the improvement comprising:

protecting means, responsive to the operation of said selection means whereby a desired output means is specified, for automatically specifying at least one further output means to be activated during testing of said desired output means, said protecting means comprising memory means for storing data identifying said at least one further output means and providing an output signal designating said at least one further output means in response to specifying of said desired output means, said memory means comprising at least a portion of said read only memory.

* * * * *